United States Patent [19]

Doak

[11] Patent Number: 4,647,620

[45] Date of Patent: Mar. 3, 1987

[54] POLYBLENDS OF A COPOLYMER OF A VINYL AROMATIC MONOMER AND AN UNSATURATED DICARBOXYLIC ACID ANHYDRIDE WITH A METHYL METHACRYLATE HOMOPOLYMER OR COPOLYMER

[76] Inventor: Kenneth W. Doak, 3469 Burnett Dr., Murrysville, Pa. 15668

[21] Appl. No.: 644,179

[22] Filed: Aug. 24, 1984

[51] Int. Cl.[4] ............... C08L 51/04; C08L 33/12; C08L 25/08
[52] U.S. Cl. .......................... 525/71; 525/74
[58] Field of Search ................ 525/74, 78, 71

[56] References Cited

U.S. PATENT DOCUMENTS

| | | | |
|---|---|---|---|
| 3,359,345 | 12/1967 | Doak et al. | 260/880 |
| 3,626,033 | 12/1971 | Keskkula et al. | 260/876 R |
| 3,642,949 | 2/1972 | Stafford et al. | 260/876 |
| 3,919,354 | 11/1975 | Moore et al. | 525/244 |
| 4,108,925 | 8/1978 | Lee | 260/876 R |
| 4,129,615 | 12/1978 | Fava | 260/876 |
| 4,197,376 | 4/1980 | Lee et al. | 525/74 |
| 4,269,950 | 5/1981 | Abolins | 525/68 |
| 4,311,806 | 1/1982 | Dufour | 525/71 |
| 4,329,272 | 5/1982 | Dufour | 524/288 |
| 4,339,554 | 7/1982 | Doak | 525/63 |
| 4,395,516 | 7/1983 | Imai et al. | 525/71 |
| 4,434,252 | 2/1984 | Dorrestijn et al. | 521/134 |
| 4,454,300 | 6/1984 | Ranade et al. | 525/71 |
| 4,510,280 | 4/1985 | Jones et al. | 524/178 |

FOREIGN PATENT DOCUMENTS

| | | |
|---|---|---|
| 767255 | 11/1971 | Belgium . |
| 71786 | 2/1983 | European Pat. Off. ............ 525/74 |
| 1046646 | 10/1966 | United Kingdom . |

OTHER PUBLICATIONS

"More-Heat-Resistant Alloys . . . ", Plastics Engineering, May, 1983, p. 23.
"New Styrene-Maleic Anhydride Terpolymer Blends", Hall et al. - Organic Coatings & Plastics Div. - vol. 47, p. 298, (Meeting of Am. Chem. Soc., Sep. 12-17, 1982).

*Primary Examiner*—Carman J. Seccuro

[57] ABSTRACT

A polyblend which has a high heat distortion temperature and good impact strength, and which may be transparent, is produced by blending 20 to 95 percent by weight of an anhydride polymer of a vinyl aromatic monomer, such as styrene or p-methylstyrene, with an unsaturated dicarboxylic acid anhydride, such as maleic anhydride, with 80 to 5 percent by weight of a methyl methacrylate homopolymer or copolymer, where at least one of the anhydride polymer or the methyl methacrylate polymer are rubber modified. Various other polymers or resins may be added to the blend, such as 10 to 60 weight percent of a vinyl chloride resin, or rubber modified vinyl chloride resin, up to 20 percent of an ungrafted rubber, or up to 40 percent of a graft copolymer of a vinyl aromatic monomer and methyl methacrylate, methacrylonitrile, or acrylonitrile or mixtures, grafted onto 10-60 percent of a substrate rubber.

24 Claims, No Drawings

POLYBLENDS OF A COPOLYMER OF A VINYL AROMATIC MONOMER AND AN UNSATURATED DICARBOXYLIC ACID ANHYDRIDE WITH A METHYL METHACRYLATE HOMOPOLYMER OR COPOLYMER

BACKGROUND OF THE INVENTION

The present invention relates to rubber-modified blends of two polymers, one or both of which are rubber-modified. One polymer contains a vinyl aromatic monomer such as styrene or p-methylstyrene, and an unsaturated dicarboxylic acid anhydride such as maleic anhydride. It may optionally contain up to 25 percent of a third monomer such as acrylonitrile, methacrylonitrile, or methyl methacrylate and may also optionally contain 5 to 30 percent of a rubber grafted with a portion of the copolymer. The other polymer is a methyl methacrylate homopolymer, or a methyl methacrylate copolymer containing up to 30 percent of a vinyl aromatic monomer or up to 20 percent of an alkyl acrylate. This polymer may optionally contain 10 to 60 percent of a rubber grafted with a portion of the polymer.

To the blend may be added, (a) 10 to 60 percent of a vinyl chloride resin, which may optionally contain 2 to 30 percent of a rubber grafted with less than 50 percent of the polymerized vinyl chloride, (b) up to 20 percent of an ungrafted rubber, or (c) up to 40 percent of a graft copolymer of rubber, styrene, and acrylonitrile, methacrylonitrile, or methyl methacrylate or a mixture thereof.

Copolymers of styrene and maleic anhydride (S/MA) are known to have high softening temperatures and have been blended with various resins which have lower softening temperatures than those of the S/MA copolymers in order to provide higher softening temperatures than those of the resin. Better impact strengths were obtained if the copolymers used in the blends were rubber-modified. The resins of such blends included styrene-acrylonitrile copolymers (S/AN), ABS resins (graft copolymers of styrene, acrylonitrile, and rubber, usually butadiene-based), vinyl chloride resins, and methyl methacrylate homopolymers or copolymers containing a small amount of styrene or an alkyl acrylate.

The present invention discloses the preparation of blends in which either component, or both, is rubber-modified by polymerizing the monomers in the presence of one or more rubbers to form a graft copolymer dispersed as a separate phase.

Belgian Pat. No. 767,255 describes polyblends of unmodified S/MA copolymers with methyl methacrylate homopolymers or copolymers containing 4, 6.5, and 7.5 percent of methyl acrylate. Blends containing the two components in a 50:50 weight ratio exhibited Vicat softening temperatures between those of the two components, indicating good compatibility. A blend of a 86.4:13.6 S/MA copolymer with a methyl methacrylate copolymer containing 20 percent of styrene exhibited a Vicat softening temperature of 114° C., compared with 126° and 103° C. for the copolymers, respectively. A blend of a 82:18 S/MA copolymer with a methyl methacrylate copolymer containing 4 percent of methyl acrylate exhibited a Vicat softening temperature of 122° C., compared with 134° and 105° C. for the two copolymers, respectively. A blend of a 76.7:23.3 S/MA copolymer with the same methyl methacrylate copolymer exhibited a Vicat temperature of 125° C., compared with 145° and 105° C. for the copolymers, respectively. Three-component blends, prepared by adding S/AN copolymers containing 20 or 25 percent of acrylonitrile to the blend, had good compatibility, based on Vicat softening temperatures.

Certain copolymers of methyl methacrylate also show good compatibility with vinyl chloride resins. Copolymers containing 5 percent of ethyl acrylate or 10 percent of butyl acrylate were reported to be miscible with polyvinyl chloride. (See Kirk-Othmer, Encyclopedia of Chemical Technology, Third Edition, Volume 18, p. 462, John Wiley and Sons, New York, 1981.)

Copolymers containing a small portion, e.g. 3 to 15 percent, of a lower alkyl acrylate comonomer are frequently used as processing aids for vinyl chloride resins, usually in amounts of 0.5 to 10 parts per hundred of resin. Such copolymers are believed to be compatible with vinyl chloride resins. The homopolymer of methyl methacrylate has been reported to be compatible with vinyl chloride resins. (See Burgess, Manufacturing and Processing of PVC, pp. 98, 237–240, MacMillan, N.Y., 1982, and European Patent Application 53,080, Nov. 23, 1981.)

U.S. Pat. No. 4,434,252 describes blends of vinyl chloride resins containing 0.1 to 15 parts per hundred of resin of homopolymers or copolymers of an alkyl methacrylate, preferably methyl methacrylate, containing up to 25 percent of an alkyl acrylate, in which the alkyl group preferably has 1 to 4 carbon atoms, or up to 20 percent of a vinyl aromatic monomer such as styrene or alpha-methylstyrene. Such blends were used for rigid foam.

As is well-known, many rubber-modified polymers, such as high impact polystyrene or S/MA copolymers containing butadiene-based rubbers, exhibit poor transparency because the refractive index of the matrix is higher than that of the dispersed rubber (or graft copolymer) phase. Blends containing such polymers also normally exhibit poor transparency. As is also well-known, the introduction of non-aromatic monomers such as acrylonitrile, methacrylic acid, methyl methacrylate, and the like into styrene polymers reduces the refractive index, while the introduction of vinyl aromatic monomers, particularly styrene, into rubbers based on 1,3-butadiene or isoprene, increases the refractive index of the graft copolymer phase. Block copolymerization is preferred, particularly if 20 percent or more of styrene is used. Such block copolymers include diblock, triblock, radial, and star-shaped copolymers.

The amount of methyl methacrylate required in the matrix copolymers to impart transparency decreases as the amount of styrene in the rubber increases. British Pat. No. 1,046,646 discloses the synthesis of transparent copolymers of styrene and methyl methacrylate prepared by copolymerizing the monomers in the presence of block copolymer rubbers of 80 to 50 percent of butadiene-1,3 and 20 to 50 percent of styrene. The ratio of styrene to methyl methacrylate was varied from 30:70 to 65:35. U.S. Pat. No. 4,129,615 discloses a transparent rubber-modified copolymer of styrene and methyl methacrylate which contained a block copolymer rubber of butadiene and styrene. U.S. Pat. No. 3,359,345 describes the preparation of transparent copolymers of methyl methacrylate and alpha-methylstyrene polymerized in the presence of a block copolymer of 1,3-butadiene and styrene.

Methyl methacrylate was introduced into graft copolymers containing styrene, acrylonitrile, and a butadiene-based rubber, in order to reduce the refractive index to match that of the graft copolymer phase (Encyclopedia of Polymer Sci. and Tech., Supp. Vol. 1, pp. 307–325, John Wiley and Sons, 1967). Polystyrene has a refractive index of about 1.591, compared with about 1.491 for polymethyl methacrylate and 1.515 for polyacrylonitrile. MBS, graft copolymers of approximately equal amounts of styrene and methyl methacrylate and about 50 weight percent of a butadiene-based rubber, are blended with vinyl chloride resins to produce transparent blends. Such blends are commercially available.

The use of rubber-modified and unmodified S/MA copolymers in blends with other resins, specifically polyvinyl chloride resins, is described in my three co-pending applications, Ser. No. 494,708, now U.S. Pat. No. 4,469,844, and Ser. No. 494,709, now U.S. Pat. No. 4,469,845, both filed May 16, 1983, and Ser. No. 636,961, filed Aug. 2, 1984, the contents of these three applications being incorporated by reference herein. Blends of such S/MA copolymers with other resins, are described in detail in said co-pending applications, and are summarized below.

U.S. Pat. No. 3,642,949 describes blends of S/MA copolymers with S/AN copolymers or ABS resins in order to provide increased softening temperatures. U.S. Pat. No. 4,339,554 describes blends of rubber-modified or unmodified S/MA copolymers with unmodified vinyl chloride resins. U.S. Pat. No. 4,197,376 describes blends of rubber-modified S/MA copolymers or terpolymers containing up to 30 percent of methyl methacrylate (S/MA/MM) or acrylonitrile (S/MA/AN) with ABS resins.

U.S. Pat. No. 3,626,033 describes blends of unmodified S/MA copolymers, unmodified vinyl chloride resins, and ABS. U.S. Pat. No. 4,329,272 describes blends of unmodified S/MA copolymers, which would optionally contain up to 20 percent of methyl methacrylate or acrylonitrile, with unmodified vinyl chloride resins. The blend could optionally contain up to 40 percent of ABS or MBS (a graft copolymer of styrene, methyl methacrylate, and a butadiene-based rubber). U.S. Pat. No. 4,311,806 describes similar blends in which the maleic anhydride copolymers or terpolymers were rubber-modified.

Bourland and Wambach (J Vinyl Technol., 1983, 5 (3), p. 121; Plastics Engineering, May, 1983, p. 23) disclosed that S/MA copolymers are partially miscible with vinyl chloride resins and hence increase the softening temperature and reduce melt viscosity. Impact modifiers could be added to the blends.

Hall, Mendelson, and Trementozzi discussed the preparation of blends of various terpolymers containing maleic anhydride with random S/AN copolymers or ABS. (See Preprint for Organic Coatings and Plastics Chemistry Division, 47, p. 298, Meeting of the Am. Chem. Soc., Sept. 12–17, 1982.)

U.S. Pat. No. 4,454,300 describes blends of a vinyl chloride-polyolefin graft (rubber-modified) copolymer with S/MA copolymers. Preferred polyolefin elastomers were copolymers of ethylene and propylene, or terpolymers containing up to 15 percent of a diene monomer (EPDM). A blend, in a 60:40 weight ratio, of an unmodified S/MA copolymer (containing 14 weight percent of maleic anhydride) with a vinyl chloride resin containing 14 percent of rubber, exhibited a heat distortion temperature of 87° C., compared with 67° C. for the vinyl chloride resin and 105° C. for the S/MA copolymer. The copolymers could contain up to 25 percent of a third monomer such as acrylonitrile or methyl methacrylate, and could be rubber-modified.

SUMMARY OF THE INVENTION

New polyblends which have high heat distortion temperatures and good impact strength, some of which may be prepared in substantially transparent form are produced by blending (A) an anhydride polymer of a vinyl aromatic monomer and an unsaturated dicarboxylic acid anhydride with (B) a methyl methacrylate homopolymer or copolymer, one of or both of (A) and (B) being rubber-modified. These polyblends comprise:

A. 20 to 95 percent by weight of an anhydride polymer of a vinyl aromatic monomer, such as styrene or p-methylstyrene, and an unsaturated dicarboxylic acid anhydride monomer, such as maleic anhydride in weight ratios of 95:5 to 65:35 and 0 to 25 percent, based on total monomers, of a copolymerizable, ethylenically unsaturated termonomer, such as methyl methacrylate, acrylonitrile, and methacrylonitrile. The polymer may optionally be a rubber-modified polymer containing 5 to 30 percent, based on weight of the rubber-modified polymer, of at least one discretely dispersed rubber grafted with a portion of the polymer by polymerizing at least a portion of the monomers in the presence of the rubber; and B. 80 to 5 percent by weight of a homopolymer of methyl methacrylate or a copolymer of methyl methacrylate containing up to 20 percent by weight of an alkyl acrylate in which the alkyl group contains 1 to 8 carbon atoms, or up to 30 percent by weight of a vinyl aromatic monomer such as styrene or p-methylstyrene.

The methyl methacrylate polymer may optionally be a rubber-modified polymer containing 10 to 60 percent, based on weight of the polymer, of at least one discretely dispersed rubber grafted with a portion of the polymer by polymerizing the monomers in the presence of the rubber.

To the polyblend there may also be added 10 to 60 percent by weight, based on weight of the polyblend, of a vinyl chloride resin, optionally containing up to 20 weight percent, based on total monomers, of a copolymerizable, ethylenically unsaturated comonomer. The vinyl chloride resin may optionally be a rubber-modified resin containing 2 to 30 percent, based on the weight of the resin, of a dispersed rubber grafted (less than 50 percent by weight) with the monomers by polymerizing at least a portion of the monomers in the presence of the rubber. Or, to the polyblend there may be added up to 20 percent of an ungrafted rubber, or up to 40 percent of a graft copolymer of a vinyl aromatic monomer and methyl methacrylate, methacrylonitrile or acrylonitrile, or a mixture thereof, a portion of which is grafted onto 10 to 60 percent, based on the weight of the graft copolymer, of a substrate rubber.

DESCRIPTION OF THE INVENTION

Heretofore, the preparation of polyblends of copolymers of styrene and maleic anhydride with a methyl methacrylate homopolymer or copolymers containing a small amount of a second monomer have been described (Belgian Pat. No. 767,255, referred to above). Such polyblends exhibited softening temperatures higher than those of methyl methacrylate polymers, and had good transparency. However, such polymers frequently do not have a sufficiently high impact strength for many applications.

This invention describes the preparation of rubber-modified polyblends of anhydride polymers of a vinyl aromatic monomer, such as styrene or p-methylstyrene, and unsaturated dicarboxylic acid anhydrides, such as maleic anhydride, with methyl methacrylate homopolymers or copolymers containing up to 30 percent by weight, preferably 5 to 20 percent, of a vinyl aromatic monomer or up to 20 percent, preferably 2 to 8 percent, of an alkyl acrylate. At least one of the polymers used in the blends is rubber-modified; both may be rubber-modified. Such polyblends exhibit higher impact strength than those in which neither component is rubber-modified. Some of the polyblends will be substantially transparent, although the rubber-modified components used in the blends generally have poor transparency, or are opaque.

The anhydride polymers used in these blends contain the vinyl aromatic monomer and unsaturated dicarboxylic acid anhydride in weight ratios of 95:5 to 65:35, preferably 92:8 to 70:30, and most preferably 88:12 to 74:26. The polymer may optionally contain up to 25 percent by weight, based on total monomers, of a copolymerizable, ethylenically unsaturated monomer such as methyl methacrylate, acrylonitrile, or methacrylonitrile.

The vinyl aromatic monomer which forms a part of the polymer is preferably styrene or p-methylstyrene (vinyl toluene containing over 90 percent of p-methylstyrene) but may also include other nuclear methyl substituted styrenes, dimethylstyrenes, monochlorostyrenes (e.g. o- or p-chlorostyrene or mixtures), alpha-methyl-p-methylstyrene, 2-chloro-4-methylstyrene, tert-butylstyrenes, dichlorostyrenes, especially 2,4-dichlorostyrene, and the like. When alpha-methylstyrene, tert-butylstyrene, or dichlorostyrene is used, it is sometimes preferable to use a mixture with styrene or p-methylstyrene to form a terpolymer of the anhydride and two vinyl aromatic monomers. Such terpolymers generally have higher softening temperatures than those of the anhydride polymers in which styrene is the only vinyl aromatic monomer. The preferred unsaturated dicarboxylic acid anhydride is maleic anhydride, although citraconic anhydride and itaconic anhydride or other anhydrides may also be suitable. The preferred termonomers are methyl methacrylate and acrylonitrile.

The rubber-modified anhydride polymers which may be used in the blends contain 5 to 30 percent, based on the weight of the rubber-modified polymer, of at least one rubber grafted with a portion of the polymer by copolymerizing the monomers in the presence of the rubber to form a dispersed graft copolymer phase, normally as discrete particles with average diameters between 0.3 and 10 microns. These rubber-modified polymers exhibit much higher impact strength than the unmodified polymers, and polyblends containing these rubber-modified polymers also exhibit higher impact strength than those containing the unmodified polymers.

Rubbers which may be used in the preparation of the rubber-modified anhydride polymers are described in my co-pending application Ser. No. 494,708, now U.S. Pat. No. 4,469,844. The preferred rubbers are butadiene-based, such as poly-1,3-butadiene, random copolymers containing 1,3-butadiene, and block copolymers of 1,3-butadiene and 10 to 55 percent of a vinyl aromatic monomer, preferably styrene, p-methylstyrene, or tert-butylstyrene. Various block copolymers have been described in British Pat. No. 2,015,007. Especially preferred rubbers are the block copolymers containing 80 to 50 percent of 1,3-butadiene and 20 to 50 percent of styrene, and poly-1,3-butadiene.

For applications where good light resistance is needed, it is desirable to use a rubber containing little or no unsaturation, such as a butyl acrylate-based rubber, a copolymer of ethylene and vinyl acetate, methyl acrylate, or ethyl acrylate, an epichlorohydrin rubber, a terpolymer of ethylene, propylene, and a diene, and chlorinated polyethylene.

The maleic anhydride copolymers or terpolymers are known compositions, and are prepared by reacting a solution of rubber (when used), maleic anhydride, vinyl aromatic monomer, and optionally methyl methacrylate or an unsaturated nitrile, such as acrylonitrile, at elevated temperatures, usually in the presence of peroxide initiators. The resulting copolymers or terpolymers have a somewhat random distribution of monomer units along the polymer chains. Typically, the Melt Flow (condition L, grams/10 minutes) is between 0.1 and 10, and is somewhat dependent on the polymer composition, as well as the amount and type of rubber. My aforedescribed copending applications summarized various techniques for the preparation of both unmodified and modified copolymers and terpolymers containing maleic anhydride.

The polymer of a vinyl aromatic monomer and an unsaturated dicarboxylic acid anhydride monomer, 20 to 95 percent by weight, is intimately mixed with 80 to 5 percent by weight of the methyl methacrylate homopolymer or copolymer. The methyl methacrylate copolymer may contain up to 30 percent by weight of a vinyl aromatic monomer or up to 20 percent by weight of an alkyl acrylate in which the alkyl group contains 1 to 8 carbon atoms. The preferred vinyl aromatic monomers are styrene, p-methylstyrene, alpha-methylstyrene, and tert-butylstyrene. The preferred alkyl acrylates are those in which the alkyl group is a methyl, ethyl, or butyl group.

The rubber-modified methyl methacylate polymers which may be used in the blends contain 10 to 60 percent, based on the weight of the rubber-modified polymer, of at least one rubber grafted with a portion of the polymer by copolymerizing the monomers in the presence of the rubber to form a dispersed graft copolymer phase. Generally, the rubber-modified polymer contains no more than about 30 percent of rubber, and at least 25 percent of the copolymer, preferably 25 to 50 percent or higher, is not grafted to the rubber, and is available for mixing into the blend matrix.

Rubbers which may be used in the preparation of the rubber-modified methyl methacrylate polymers may be selected from those suitable for use in the preparation of the rubber-modified anhydride polymers. Especially preferred are the butadiene-based rubbers, butyl acrylate-based rubbers (e.g. containing 1,3-butadiene), a terpolymer of ethylene, propylene, and a diene, and chlorinated polyethylene.

The methyl methacrylate homopolymers and copolymers may be prepared by conventional bulk, solution, suspension, and emulsion processes. (See Kirk-Othmer, Encyclopedia of Chemical Technology, Third Edition, Vol. 1, pp. 394–401 and Vol. 15, pp. 377–398, John Wiley and Sons, New York, 1981.)

In one embodiment of this invention, substantially transparent polyblends are obtained. Although unmodified S/MA copolymers are normally substantially transparent, the rubber-modified copolymers generally have poor transparency or are opaque, presumably because the refractive index of the copolymer matrix is higher than that of the graft copolymer particles.

Polyblends containing such rubber-modified S/MA copolymers also generally have poor transparency because of a refractive index mismatch. If the refractive index of the blend matrix is reduced to that of the graft copolymer particles, transparency of the blends will be greatly improved. This is accomplished by the addition of controlled amounts of the unmodified methyl methacrylate polymer, which has a lower refractive index than that of the S/MA copolymers, and also easily forms an intimate mixture (has good compatibility) with the matrix of the S/MA copolymer. Particularly suitable are the methyl methacrylate copolymers containing about 2 to 8 percent of methyl acrylate or ethyl acrylate, preferably the copolymers containing methyl acrylate. Copolymers containing up to 30 percent of a vinyl aromatic monomer may also be used; however, these have a higher refractive index than the copolymers containing an acrylate, and more is required in the polyblend to impart good transparency.

The amount of methyl methacrylate polymer which would impart good transparency to blends is generally in the range of 10 to 50 weight percent, depending on the amount of maleic anhydride and termonomer in the anhydride polymer, the composition of the methyl methacrylate polymer, and the composition of the rubber or graft copolymer. The amount of methyl methacrylate polymer required will decrease as the amount of maleic anhydride or termonomer in the maleic anhydride polymer increases. It is sometimes desirable to use anhydride polymers which contain up to about 15 percent of methyl methacrylate, particularly if the amount of the maleic anhydride is relatively low.

Particularly suitable rubbers for use in the formation of transparent blends are the block copolymer rubbers of 1,3-butadiene and a vinyl aromatic monomer, preferably styrene or p-methylstyrene, since the refractive index can be increased above that of polybutadiene by increasing the weight ratio of vinyl aromatic monomer to 1,3-butadiene. Block copolymers containing 10 to 55 weight percent or higher, of styrene or p-methylstyrene and 90 to 45 weight percent of 1,3-butadiene may be used. Preferred are those which contain 20 to 50 percent of the vinyl aromatic monomer. The refractive index of the graft copolymer particles will also increase as the amount of grafted or occluded maleic anhydride polymer increases.

It is also possible to use a rubber-modified methyl methacrylate polymer, together with a rubber-modified S/MA copolymer, in the preparation of substantially transparent blends. In such blends, the rubbers (graft copolymer) in both components would have similar refractive indices, and the ratio of the two polymers is adjusted to give a matrix of similar refractive index. An unmodified S/MA copolymer may also be blended with a rubber-modified methyl methacrylate polymer to give a substantially transparent blend.

To the polyblends of this invention there may be added 10 to 60 weight percent of a vinyl chloride resin, either unmodified or rubber-modified, or a mixture of two such resins. Such addition would provide improved flame retardancy. The presence of the methyl methacrylate polymers, particularly the copolymers, of this invention, will provide improved compatibility of the vinyl chloride resins and maleic anhydride polymers, since both are known to have good compatibility with such methyl methacrylate polymers. Vinyl chloride resins have previously been blended with maleic anhydride polymers, as discussed earlier in this disclosure and as discussed in U.S. Pat. Nos. 4,329,272; 4,311,806 and 4,454,300. These prior art blends could optionally contain MBS impact modifiers in which the ratio of comonomer (styrene) to methyl methacrylate was significantly higher than in the methyl methacrylate polymers of this invention, e.g. from 60:40 to 80:20, compared with 0:100 to 20:80. In my aforementioned copending applications, the ratios of styrene to methyl methacrylate were 20:80 to 70:30.

Particularly desirable blends are those which contain the anhydride polymer and methyl methacrylate polymer in weight ratios of about 85:15 to 40:60 and about 20 to 40 percent, based on weight of the polyblend, of the vinyl chloride resin. The anhydride polymer is preferably rubber-modified with a block copolymer rubber, and the vinyl chloride resin is rubber-modified, preferably with a polyolefin rubber.

It is feasible to prepare a three-component polyblend which is substantially transparent by adding a substantially transparent vinyl chloride resin of matching refractive index to a substantially transparent blend of the two polymers, of which at least one is rubber-modified. It is necessary to use a rubber in the preparation of the rubber-modified polymer which has a refractive index similar to that of the vinyl chloride resin. According to British Pat. No. 2,015,007, block copolymers of styrene and 1,3-butadiene, e.g. those containing about 30 to 40 weight percent of styrene and 70 to 60 percent of 1,3-butadiene have refractive indices close to those of certain vinyl chloride resins (1.52 to 155). Polychloroprene also has a refractive index similar to that of vinyl chloride resins.

Methods for the preparation of vinyl chloride resins which may be used in this invention involve bulk, suspension, and emulsion processes, and are well-known in the art and reported in the literature. See, for example, Kirk-Othmer, *Encyclopedia of Chemical Technology,* Third Edition, Volume 23, pages 900–936, 1981, John Wiley and Sons, Inc., New York; European Patent Application 53,080 published Dec. 1, 1982; and Burgess, *Manufacture and Processing of PVC,* MacMillan, New York (1982). Many suitable resins are available commercially.

Either or both vinyl chloride resins which may be used in the blends of this invention may comprise a homopolymer of vinyl chloride, or a copolymer of vinyl chloride and up to about 20 percent by weight of a copolymerizable, ethylenically unsaturated comonomer such as ethylene, propylene, isobutylene or other alpha-olefin with 4 to 8 carbon atoms, vinyl acetate, vinyl stearate, vinylidene chloride, an alkyl acrylate, acrylic or methacrylic, vinyl alkyl ethers in which the alkyl group contains 4 to 20 carbon atoms, and the like. In most instances, the amount of comonomer should be less than 10 percent because of the adverse effect on heat distortion temperature and rigidity. Most preferably, the comonomer is vinyl acetate, ethylene, propylene, isobutylene, or a vinyl alkyl ether, such as vinyl isobutyl ether.

The rubber-modified vinyl chloride resins which may be used are prepared by the polymerization of vinyl chloride in the presence of one or more rubbers. Suitable rubbers are disclosed in my co-pending applications Ser. No. 494,708, now U.S. Pat. No. 4,469,844, and Ser. No. 494,709, now U.S. Pat. No. 4,469,845. The preferred rubbers are copolymers of ethylene and up to about 50 percent of vinyl acetate, copolymers of ethylene and an alkyl acrylate in which the alkyl group contains 1 to 8 carbon atoms (particularly those alkyl acrylates in which the alkyl group is a methyl, ethyl or butyl group), chlorinated polyethylene containing 20 to 40 percent of chlorine, a terpolymer of ethylene, propylene, and a diene termonomer, and butyl acrylate-based rubbers.

The preparation of rubber-modified vinyl chloride resins (graft copolymers) containing 2 to about 20 percent of rubber and their use in blends was discussed in detail in my co-pending applications Ser. No. 494,708, now U.S. Pat. No. 4,469,844, and Ser. No. 494,709, now U.S. Pat. No. 4,469,845. Such resins may be used in the blends of this invention. My co-pending application Ser. No. 636,961 disclosed the use of rubber-modified resins containing 15 to 50 percent of rubber, together with unmodified resins. Such mixtures may also be used in the polyblends of this invention. The amount of rubber grafted with vinyl chloride homopolymer or copolymer is 2 to 30 weight percent based on the total polymerized vinyl chloride and comonomer in the the polyblend, and less than 50 percent of the total is grafted to the rubber.

Transparent, unmodified vinyl chloride resins may be prepared if the additives are properly chosen. Such resins are commercially available. U.S. Pat. No. 4,102,460 describes the preparation of a substantially transparent rubber-modified vinyl chloride resin by polymerizing the vinyl chloride in the presence of a copolymer of ethylene and ethyl acrylate in a weight ratio of 82:18. Copolymers of ethylene and methyl acrylate gave poorer transparency. Transparent vinyl chloride resins are also prepared by the addition of about 5 to 25 weight percent of an MBS resin of matching refractive index, containing about equal amounts of styrene and methyl methacrylate, to an unmodified vinyl chloride resin.

To the polyblends of this invention there may be added one or more impact modifiers selected from up to 20 weight percent, based on weight of the polyblend, of an ungrafted rubber, or up to 40 percent of a graft copolymer.

Suitable ungrafted rubbers include those used in the preparation of the rubber-modified polymers or vinyl chloride resins. The preferred rubbers are the block copolymer rubbers, especially those containing 80 to 50 percent of 1,3-butadiene and 20 to 50 percent of styrene or p-methylstyrene, hydrogenated such block copolymers, copolymers of ethylene and vinyl acetate, methyl acrylate, or ethyl acrylate, butyl acrylate-based rubbers, chlorinated polyethylene, and polyolefin rubbers.

The graft copolymers which may be used include the copolymers of a vinyl aromatic monomer and methyl methacrylate, acrylonitrile, or methacrylonitrile or mixtures thereof, a portion of which is grafted to 10 to 60 percent, based on weight of the graft copolymer, of a substrate rubber. These graft copolymers include the commercial impact modifiers known as MBS, ABS, and MABS. The preferred graft copolymers are those which contain 30 to 70 percent, based on monomers, of the vinyl aromatic monomer and 70 to 30 percent of methyl methacrylate; or 60 to 80 percent of the vinyl aromatic monomer and 40 to 20 percent of acrylonitrile. The preferred vinyl aromatic monomers are styrene, p-methylstyrene, alpha-methylstyrene, and tert-butylstyrene, or mixtures thereof. Suitable rubbers include polybutadiene, block copolymers of a diene and a vinyl aromatic monomer, a terpolymer of ethylene, propylene, and a diene, a butyl acrylate-based rubber, and chlorinated polyethylene. Methods for the preparation of the graft copolymers have been reviewed in my aforementioned co-pending applications and in U.S. Pat. No. 4,454,300, British Pat. No. 2,015,007, and European Application 53,080.

The modifier may be blended simultaneously with the blending of the other components, or a portion or all of the modifier may be pre-blended with individual components prior to the preparation of the final blend. For example, a block copolymer rubber may be pre-blended with anhydride polymers, or an MBS resin may be pre-blended with an unmodified vinyl chloride resin, but the invention is not limited to these examples.

The anhydride polymer and methyl methacrylate polymer, and optional components, may be blended, in the prescribed amounts, by mechanically working the components at a temperature high enough such that the mass is plasticized, e.g. by mixing on a two-roll mill, an internal mixer such as a Brabender or Banbury mixer, a twin-screw extruder, or a Farrell mixer. In order to provide a homogenous blend, the mixing equipment must provide a high shear. Some extruders, especially single screw extruders, may not provide sufficient shear for some blends. In some cases it may be necessary to plasticize first the component which has the highest melt viscosity and then add the other components in one or more increments. A batch mixer, or a high shear continuous mixer with one or more side feed ports, might be used. When more than two components are blended, it may sometimes be desirable to prepare first a blend of two components.

The various components of the blends will exhibit different heat distortion temperatures, depending on the amount of comonomer, rubber, plasticizer, stabilizers, and other additives used. Therefore, the heat distortion temperature of a blend will be dependent on the heat distortion temperatures of the anhydride polymer, the methyl methacrylate polymer, and optional polymers. The following illustrates the types and amounts of the components used in the blended compositions of the present invention.

In one example, a rubber-modified copolymer, containing styrene and maleic anhydride in a weight ratio of about 80:20, is blended with a copolymer containing methyl methacrylate and methyl acrylate in a weight ratio of about 96:4. The copolymer of styrene and maleic anhydride contains about 12 percent, based on total weight of the rubber-modified copolymer, of a block copolymer rubber containing 1,3-butadiene and styrene in the weight ratio of about 80:20. Blends containing the two polymers in weight ratios of about 35:65 to about 70:30 will exhibit Vicat softening temperatures which will vary between about 112° C. and 121° C., compared with about 132° C. and 105° C. for the anhydride polymer and the methyl methacrylate copolymer, respectively. A vinyl chloride resin, preferably rubber-modified, may be added to these blends, or to the components of these blends, in varying amounts, e.g. 20 to 40 percent, based on total weight of the blends. Vicat softening temperatures will be intermediate between that of the vinyl chloride resin and those of the two-component blends.

In a second example, a copolymer containing styrene and maleic anhydride in a weight ratio of 78:22, and rubber-modified with about 10 percent of a block copolymer, containing 1,3-butadiene and styrene in a weight ratio of 60:40, is blended with the methyl methacrylate copolymer of the first example. The Vicat softening temperature will be about 122° C.

In a third example, an unmodified copolymer containing styrene and maleic anhydride in a weight ratio of about 82:18 and a rubber-modified copolymer containing methyl methacrylate and ethyl acrylate in a weight ratio of about 95:5 are blended in a weight ratio of about 70:30. The copolymer of methyl methacrylate and ethyl acrylate contains about 15 percent, based on total weight of the rubber-modified copolymer, of a polybutadiene rubber. The blend will exhibit a Vicat softening temperature about 122° C. compared with about 134° C. and 98° C. for the anhydride polymer and the methyl methacrylate copolymer, respectively. A similar result will be obtained if about half of the styrene in the anhydride polymer is replaced with p-methylstyrene. In other variations to increase impact strength, about 10 percent, based on weight of the polyblend, of a block copolymer rubber or 15 percent of an ABS resin may be added to the polyblend.

In a fourth example, the rubber-modified copolymers of the first and third examples are blended in weight ratios varying between 30:70 and 70:30. The blends will exhibit Vicat softening temperatures intermediate between those of the two components.

In a fifth example, a rubber-modified copolymer containing styrene and maleic anhydride in a weight ratio of about 85:15 is blended with an unmodified copolymer containing methyl methacrylate and styrene in a weight ratio of about 85:15. The copolymer of styrene and maleic anhydride contains about 12 percent, based on total weight of the rubber-modified copolymer, of the block copolymer rubber used in the first example. A blend of the two copolymers in a weight ratio of about 50:50 will exhibit a Vicat softening temperature of about 112° C., compared with about 122° C. and 105° C. for the anhydride polymer and the methyl methacrylate copolymer, respectively.

What is claimed is:

1. A substantially transparent polyblend composition consisting essentially of:
   (a) 20 to 95 percent by weight of an anhydride polymer of a vinyl aromatic monomer and an unsaturated dicarboxylic acid anhydride monomer, in a weight ratio of 95:5 to 65:35; and
   (b) 80 to 5 percent by weight of a methyl methacrylate polymer, selected from the group consisting of a homopolymer of methyl methacrylate, a copolymer of methyl methacrylate, and up to 30 percent by weight of a vinyl aromatic monomer, and a copolymer of methyl methacrylate and up to 20 percent by weight of an alkyl acrylate in which the alkyl group contains 1 to 8 carbon atoms;
wherein at least one of (a) and (b) is a rubber modified polymer prepared by polymerization of monomers, from which the polymer is formed, in the presence of a rubber to graft a portion thereof to said rubber, to form a dispersed graft copolymer phase; at least 25 percent of said methyl methacrylate polymer, when rubber modified, is not grafted to said rubber; any ungrafted anhydride polymer and any ungrafted methyl methacrylate polymer form a compatible, transparent matrix; the ratio of the anhydride polymer to the methyl methacrylate polymer is adjusted to give said matrix with a refractive index substantially equal to that of the dispersed graft copolymer phase; and the refractive index of the dispersed graft copolymer phase is lower than that of the ungrafted anhydride polymer, and higher than that of the ungrafted methyl methacrylate polymer.

2. A polyblend composition as defined in claim 1 wherein both (a) and (b) are rubber modified polymers.

3. A polyblend composition as defined in claim 1 wherein said anhydride polymer contains the vinyl aromatic monomer and the dicarboxylic acid anhydride in weight ratios of between 92:8 to 70:30.

4. A polyblend composition as defined in claim 3 wherein the weight ratio of said anhydride polymer to said methyl methacrylate polymer is between 90:10 to 50:50.

5. A polyblend composition as defined in claim 4 wherein the anhydride polymer is a rubber modified polymer containing a block copolymer of 80 to 50 weight percent 1,3-butadiene and 20 to 50 weight percent styrene.

6. A polyblend as defined in claim 5 wherein said anhydride polymer contains up to 15 percent by weight, based on monomers, of methyl methacrylate.

7. A polyblend composition as defined in claim 1 wherein said anhydride polymer contains up to 25 percent by weight of said monomers of a copolymerizable, ethylenically unsaturated termonomer selected from the group consisting of methyl methacrylate, acrylonitrile, and methacrylonitrile.

8. A polyblend composition as defined in claim 1 wherein said methyl methacrylate polymer is a copolymer containing an alkyl acrylate in which the alkyl group contains 1–8 carbon atoms, in an amount of up to 20 percent, based on the weight of the monomers.

9. A polyblend composition as defined in claim 8 wherein said alkyl group is selected from the group consisting of a methyl, ethyl and butyl group.

10. A polyblend composition as defined in claim 9 wherein said alkyl acrylate is present in an amount of between 2 to 8 percent based on the weight of the monomers.

11. A polyblend composition as defined in claim 1 wherein said methyl methacrylate polymer is a copolymer containing up to 30 percent by weight of a vinyl aromatic monomer.

12. A polyblend composition as defined in claim 1 wherein the methyl methacrylate polymer is a homopolymer of methyl methacrylate.

13. A polyblend composition as defined in claim 2 wherein said anhydride polymer is rubber-modified with a block copolymer rubber and the methyl methacrylate polymer is rubber modified with a rubber selected from the group consisting of a butadiene-based rubber and a butyl acrylate-based rubber.

14. A polyblend composition as defined in claim 1 wherein the rubber in the rubber-modified polymer is selected from the group consisting of polybutadiene, random copolymers of 1,3-butadiene and a vinyl aromatic monomer, block copolymers of 90 to 45 percent of 1,3-butadiene and 10 to 55 percent of a vinyl aromatic monomer, a butyl acrylate-based rubber, a copolymer of ethylene and vinyl acetate, a copolymer of ethylene and methyl acrylate, a copolymer of ethylene and ethyl acrylate, a terpolymer of ethylene, propylene and a diene monomer, an epichlorohydrin rubber, and chlorinated polyethylene.

15. A polyblend composition as defined in claim 14 wherein the vinyl aromatic monomer in said anhydride polymer is selected from the group consisting of styrene and p-methylstyrene, and said dicarboxylic acid anhydride is maleic anhydride.

16. A polyblend composition as defined in claim 15 wherein said vinyl aromatic monomer is styrene and the ratio of styrene to maleic anhydride in between 92:8 to 70:30, and the methyl methacrylate polymer contains 2 to 8 percent by weight, based on monomers, of an acrylate selected from the group consisting of methyl acrylate and ethyl acrylate.

17. A polyblend composition as defined in claim 16 wherein the anhydride polymer is a rubber-modified polymer containing a block copolymer of 1,3-butadiene and a vinyl aromatic monomer.

18. A polyblend composition as defined in claim 1 wherein there is added to said polyblend, up to 20 percent by weight, based on the weight of the polyblend, of an ungrafted rubber.

19. A polyblend composition as defined in claim 1 wherein there is added to said polyblend, up to 40 percent, based on weight of the polyblend, of a graft copolymer of a vinyl aromatic monomer and a comonomer selected from the group consisting of acrylonitrile, methacrylonitrile, methyl methacrylate, and mixtures thereof, a portion of which is grafted to 10 to 60 percent of a substrate rubber.

20. A polyblend composition as defined in claim 19 in which the comonomer in the graft copolymer is 20 to 30 percent of acrylontrile.

21. A polyblend composition as defined in claim 1 wherein the anhydride polymer is rubber modified and comprised of styrene and maleic anhydride in a weight ratio of 92:8 to 70:30 and 0–15% methyl methacrylate; the rubber in the rubber modified anhydride polymer is a block copolymer rubber of styrene and butadiene in a weight ratio of 20:80 to 50:50; the methyl methacrylate polymer is a homopolymer or a copolymer selected from the group consisting of a copolymer of methyl methacrylate and 2–8 weight percent of an alkyl acrylate selected from the group consisting of methyl acrylate and ethyl acrylate, and a copolymer of methyl methacrylate and 5–20 percent styrene; and the ratio of said rubber modified anhydride polymer to said methyl methacrylate polymer is 90:10 to 50:50.

22. A polyblend as defined in claim 21 wherein there is added to said polyblend, up to 20 percent by weight, based on the weight of the polyblend, of an ungrafted rubber.

23. A polyblend as defined in claim 22 wherein the refractive index of the dispersed graft copolymer particles in the rubber-modified anhydride polymer matches the refractive index of the blend matrix of the anhydride polymer and methyl methacrylate polymer.

24. A polyblend as defined in claim 23 wherein the ungrafted rubber is a block copolymer containing 80 to 50 percent of 1,3-butadiene and 20 to 50 percent of styrene or p-methylstyrene.

* * * * *